United States Patent
Saiki et al.

(10) Patent No.: US 12,098,076 B2
(45) Date of Patent: Sep. 24, 2024

(54) SILICA POWDER, RESIN COMPOSITION, AND DISPERSION

(71) Applicant: TOKUYAMA CORPORATION, Yamaguchi (JP)

(72) Inventors: Keiji Saiki, Yamaguchi (JP); Masayuki Numata, Yamaguchi (JP); Teppei Ueno, Yamaguchi (JP); Hiroo Aoki, Yamaguchi (JP)

(73) Assignee: TOKUYAMA CORPORATION, Yamaguchi (JP)

(*) Notice: Subject to any disclaimer, the term of this patent is extended or adjusted under 35 U.S.C. 154(b) by 520 days.

(21) Appl. No.: 17/425,852

(22) PCT Filed: Feb. 13, 2020

(86) PCT No.: PCT/JP2020/005618
§ 371 (c)(1),
(2) Date: Jul. 26, 2021

(87) PCT Pub. No.: WO2020/175160
PCT Pub. Date: Sep. 3, 2020

(65) Prior Publication Data
US 2022/0002165 A1    Jan. 6, 2022

(30) Foreign Application Priority Data

Feb. 28, 2019 (JP) ................. 2019-035109

(51) Int. Cl.
*C01B 33/12* (2006.01)
*C08K 3/36* (2006.01)
(Continued)

(52) U.S. Cl.
CPC ............... *C01B 33/12* (2013.01); *C08K 3/36* (2013.01); *C08L 57/00* (2013.01); *C08L 87/00* (2013.01);
(Continued)

(58) Field of Classification Search
CPC .... C01B 33/12; C08K 3/36; C08K 2201/005; C08K 2201/011; C08L 5/00; C08L 87/00; C01P 2004/51; C01P 2006/10
See application file for complete search history.

(56) References Cited

U.S. PATENT DOCUMENTS

| | | |
|---|---|---|
| 2003/0152506 A1 | 8/2003 | Shibasaki et al. |
| 2009/0136672 A1 | 5/2009 | Panz et al. |

(Continued)

FOREIGN PATENT DOCUMENTS

| | | |
|---|---|---|
| CN | 101070160 | 11/2007 |
| CN | 101873995 | 10/2010 |

(Continued)

OTHER PUBLICATIONS

Analytik. "Quantitative Particle Size Distribution Analysis by Laser Diffraction and Differential Centrifugal Sedimentation A comparison of techniques". 2020.*

(Continued)

*Primary Examiner* — Richard M Rump
(74) *Attorney, Agent, or Firm* — Casimir Jones, S.C.; Robert A. Goetz

(57) ABSTRACT

Provided is silica powder that, when used as a resin filler such as a semiconductor sealant, allows for obtaining a resin composition having excellent gap permeability and low viscosity. The silica powder is such that (1) a cumulative 50% mass diameter $D_{50}$ of a mass-based particle size distribution obtained by a centrifugal sedimentation method is 300 nm to 500 nm (preferably, 330 nm to 400 nm), (2) a loose bulk density is 250 kg/m$^3$ to 400 kg/m$^3$ (preferably, 270 kg/m$^3$ to 350 kg/m$^3$), and (3) $\{(D_{90}-D_{50})/D_{50}\}\times 100$ is 30% to 45%. In a silica production method in which a silicon compound is burned, silica powder can be produced by installing a burner having a concentric multiple pipe structure of three or more pipes in a reactor which has a cooling (Continued)

jacket portion provided around the burner, and adjusting flame combustion conditions and cooling conditions.

7 Claims, 1 Drawing Sheet

(51) Int. Cl.
  *C08L 57/00* (2006.01)
  *C08L 87/00* (2006.01)
(52) U.S. Cl.
  CPC ...... *C01P 2004/51* (2013.01); *C01P 2006/10* (2013.01); *C08K 2201/005* (2013.01); *C08K 2201/011* (2013.01)

(56) References Cited

U.S. PATENT DOCUMENTS

| | | | |
|---|---|---|---|
| 2009/0253851 | A1 | 10/2009 | Ohara et al. |
| 2019/0040264 | A1 | 2/2019 | Nishimine et al. |
| 2019/0127228 | A1* | 5/2019 | Pihan ............... C01B 32/342 |
| 2020/0317928 | A1 | 10/2020 | Nishimine et al. |
| 2021/0061992 | A1* | 3/2021 | Tanaka ............... C08K 3/36 |

FOREIGN PATENT DOCUMENTS

| | | |
|---|---|---|
| CN | 109321000 | 2/2019 |
| JP | 2001-089130 | 4/2001 |
| JP | 2002-003213 | 1/2002 |
| JP | 2003-171117 | 6/2003 |
| JP | 2005-015251 | 1/2005 |
| JP | 2006-096599 | 4/2006 |
| JP | 2008-019157 | 1/2008 |
| JP | 2014-028738 | 2/2014 |
| JP | 2014-152048 | 8/2014 |
| JP | 2014-201461 | 10/2014 |
| JP | 2017-041471 | 2/2017 |
| JP | 2017-119621 | 7/2017 |
| JP | 2018-070397 | 5/2018 |
| WO | WO 2007/057262 | 5/2007 |
| WO | WO 2018/145953 | 8/2018 |

OTHER PUBLICATIONS

English Translation of International Preliminary Report on Patentability for PCT/JP2020/005618, mailed Sep. 10, 2021, 6 pages.
International Search Report for PCT/JP2020/005618, mailed Mar. 24, 2020, 2 pages.
International Search Report for PCT/JP2021/015132 and its English translation, mailed Jun. 8, 2021, 4 pages.

* cited by examiner

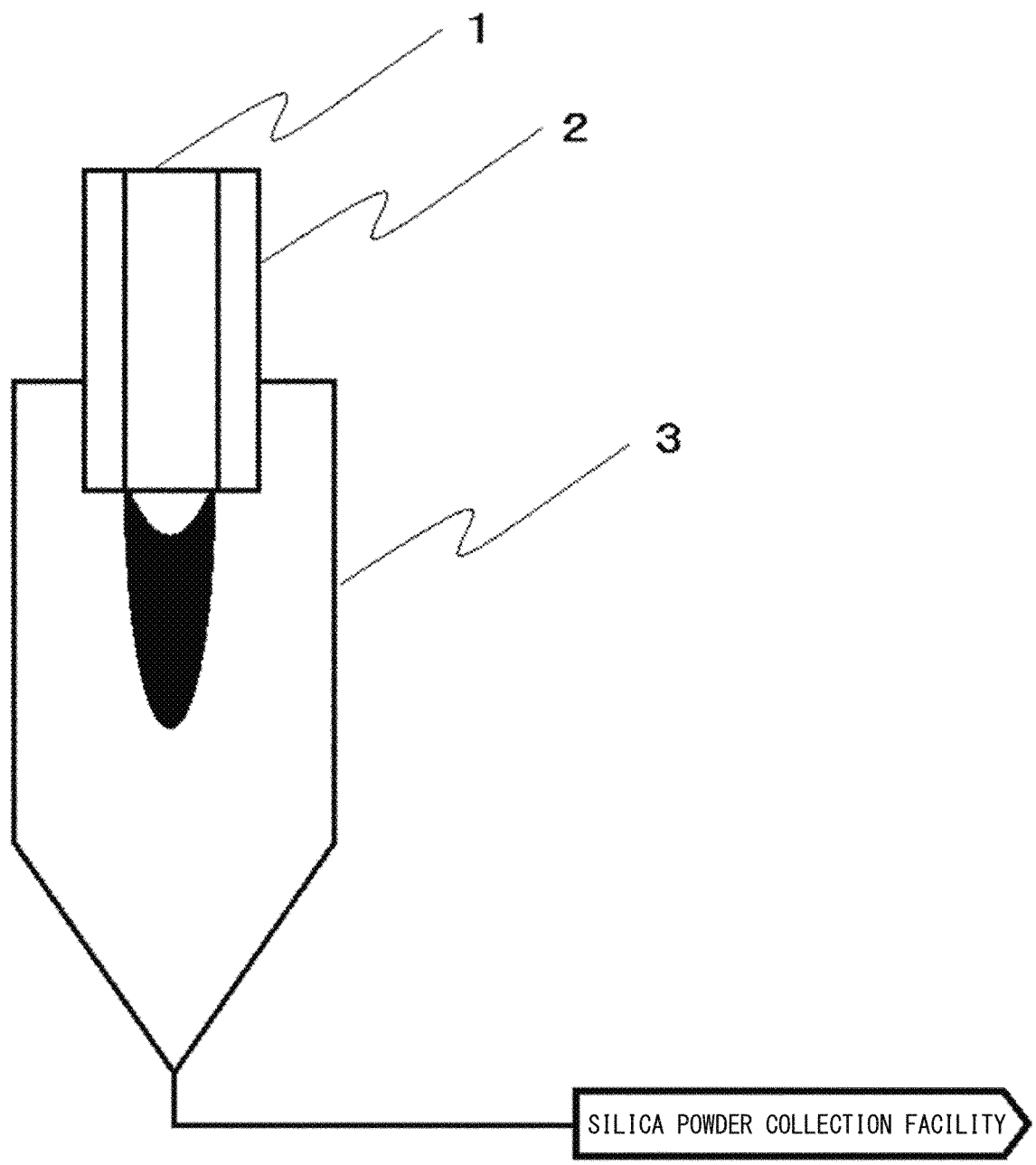

SILICA POWDER, RESIN COMPOSITION, AND DISPERSION

TECHNICAL FIELD

The present invention relates to novel silica powder, a resin composition, and a dispersion. More specifically, the present invention relates to silica powder that has a controlled particle diameter and a controlled particle size distribution and thus has an excellent filling property. In particular, the present invention provides novel silica powder that can be suitably used as a filler to be added to a resin composition used for a semiconductor sealant or the like.

BACKGROUND ART

In recent years, with the miniaturization and thickness reduction of semiconductor devices for the purpose of higher degrees of integration and higher mounting densities, fillers added to a semiconductor sealant and a semiconductor mounting adhesive, which are typified by an epoxy resin composition, tend to have smaller particle diameters. Conventionally, amorphous silica powder having a BET specific surface area of not less than 5 $m^2$/g and not more than 20 $m^2$/g and a particle diameter of about not less than 100 nm and not more than 600 nm in terms of primary particle diameter has been used as the fillers.

However, the existing amorphous silica powder having the above-described BET specific surface area, due to generally having a high degree of aggregation property, has poor dispersibility and consequently has a large dispersed particle diameter and further has a broad particle size distribution at the time of dispersion. It has been found that a resin composition using such amorphous silica powder includes coarse particles derived from a filler and thus leads to poor penetration, which is insufficient penetration of the resin into gaps during molding.

To solve the poor penetration into the gaps, there has been proposed hydrophilic dry silica powder that, in spite of having the BET specific surface area in a range of not less than 5 $m^2$/g and not more than 20 $m^2$/g, which is the same as the range of the BET specific surface area of the conventional silica powder, has an extremely low aggregation property, has excellent dispersibility, has a small dispersed particle diameter, and has a narrow particle size distribution at the time of dispersion (Patent Literature 1). Further, the silica powder described in Patent Document 2 has also been proposed.

CITATION LIST

Patent Literatures

[Patent Literature 1]
Japanese Patent Application Publication Tokukai No. 2014-152048
[Patent Literature 2]
Japanese Patent Application Publication Tokukai No. 2017-119621

SUMMARY OF INVENTION

Technical Problem

Unfortunately, the silica powder described in Patent Literature 1 has the following problem. That is, the silica powder described in Patent Literature 1 has an enhanced permeability of the resin into the gaps, but has a small dispersed particle diameter. This induces the effect of increasing the viscosity of a resin composition. Consequently, a resin composition which is filled with the silica powder described in Patent Literature 1 has high viscosity.

On the other hand, Patent Literature 2 has proposed silica powder that, in spite of having the BET specific surface area of not less than 5 $m^2$/g and not more than 20 $m^2$/g, has a particle diameter which keeps the viscosity low at the time of dispersion, do not contain coarse particles which hinder penetration into gaps, and has unique dispersibility. Due to this unique dispersibility, it has been shown that a resin composition to which the silica powder described in Patent Literature 2 was added as a filler exhibits excellent performance in terms of both viscometric property and the gap permeability. However, there has been desired further performance improvement in terms of the viscometric property and the gap permeability to adapt to the demand for narrowing of gaps.

Thus, it is an object of the present invention to provide silica powder that has a controlled particle diameter and a controlled particle size distribution and thus has an excellent filling property. More specifically, it is an object of the present invention to provide silica powder that, when used as a resin filler, allows for obtaining a resin composition having excellent gap permeability and low viscosity.

Solution to Problem

In order to solve the above problems, the inventors of the present invention have diligently studied, regarding silica obtained by burning a silicon compound in a flame, for example, the growth of silica particles and the aggregation of the particles in a flame and in the vicinity of the flame, by changing a burner, a reactor in which the burner is installed, flame conditions, and others. As a result, the inventors have found that silica powder having excellent filling property that achieves the above object can be obtained by adjusting the flame conditions, and have completed the present invention.

That is, the present invention is silica powder that satisfies all of the following conditions (1) to (3):
(1) A cumulative 50% mass diameter $D_{50}$ of a mass-based particle size distribution obtained by a centrifugal sedimentation method is not less than 300 nm and not more than 500 nm.
(2) A loose bulk density is not less than 250 kg/$m^3$ and not more than 400 kg/$m^3$.
(3) $\{(D_{90}-D_{50})/D_{50}\} \times 100$ is not less than 30% and not more than 45%, wherein $D_{90}$ is a cumulative 90% mass diameter of the mass-based particle size distribution obtained by the centrifugal sedimentation method.

Advantageous Effects of Invention

The silica powder of the present invention has a controlled particle diameter and a controlled particle size distribution and thus has an enhanced filling property. Therefore, a resin composition to which the silica powder of the present invention is added can have both excellent viscometric property and excellent gap permeability. Therefore, the silica powder of the present invention is suitable as a filler for a semiconductor sealant and for a semiconductor mounting adhesive. In particular, the silica powder of the present invention can be suitably used as a filler for a high-density mounting resin.

BRIEF DESCRIPTION OF DRAWINGS

FIG. 1 is a schematic diagram of a main part of a reaction apparatus used at the production of silica.

DESCRIPTION OF EMBODIMENTS

The silica powder of the present invention is silica powder obtained by a silica powder production method in which silica powder is formed by burning a silicon compound and is grown and aggregated in a flame and in the vicinity of the flame, a so-called "dry method (also referred to as a combustion method, etc.)". The silica powder of the present invention has the following properties:

(1) A cumulative 50% mass diameter $D_{50}$ of a mass-based particle size distribution obtained by a centrifugal sedimentation method is not less than 300 nm and not more than 500 nm.
(2) A loose bulk density is not less than 250 kg/m$^3$ and not more than 400 kg/m$^3$.
(3) $\{(D_{90}-D_{50})/D_{50}\}\times100$ is not less than 30% and not more than 45%, wherein $D_{90}$ is a cumulative 90% mass diameter of the mass-based particle size distribution obtained by the centrifugal sedimentation method.

In a case where the cumulative 50% mass diameter $D_{50}$ (hereinafter also referred to as "median diameter $D_{50}$") of the mass-based particle size distribution obtained by the centrifugal sedimentation method exceeds 500 nm, a resin composition, in spite of having low viscosity, has an excessively large silica particle diameter in relation to the gap. This results in voids generated during gap permeation and causes a molding defect. That is, sufficient narrow gap permeability cannot be obtained. On the other hand, a particle diameter of less than 300 nm is not preferable because it results in a resin composition having high viscosity. More preferably, the particle size is not less than 330 nm and not more than 400 nm.

The filling property of silica powder is specified by the loose bulk density of not less than 250 kg/m$^3$ and not more than 400 kg/m$^3$. Here, the loose bulk density is a filling density obtained when the silica powder is naturally dropped into a cup having a predetermined capacity. The loose bulk density of less than 250 kg/m$^3$ is not preferable because it causes low filling property and thus results in a resin composition having high viscosity.

In a case where the loose bulk density exceeds 400 kg/m$^3$, a resin composition, in spite of having low viscosity, has an excessively large silica particle diameter in relation to the gap. This results in voids generated during gap permeation and causes a molding defect. That is, sufficient narrow gap permeability cannot be obtained. Preferably, the loose bulk density is not less than 270 kg/m$^3$ and not more than 350 kg/m$^3$.

The property such that the particle size distribution is appropriately adjusted is specified by a relation between the cumulative 50% mass diameter $D_{50}$ and the cumulative 90% mass diameter $D_{90}$ being such that $\{(D_{90}-D_{50})/D_{50}\}\times100$ is not less than 30% and not more than 45%. The particle size distribution expressed by the above-described formula exceeding 45% increases coarse particles and causes voids. On the other hand, the particle size distribution of less than 30%, which is a narrow particle size distribution, is not preferable because it decreases a bulk density value and thus does not achieve low viscosity. More preferably, $\{(D_{90}-D_{50})/D_{50}\}\times100$ is not less than 33% and not more than 42%.

Further, the silica powder of the present invention preferably has a geometric standard deviation $\sigma_g$ of the mass-based particle size distribution obtained by the centrifugal sedimentation method in a range of not less than 1.25 and not more than 1.40. It can be said that a small geometric standard deviation $\sigma_g$ shows a narrow particle size distribution, and thus it can be said that the amount of coarse particles is decreased. However, the presence of a particle size distribution in a certain range is likely to decrease the viscosity obtained when the silica powder is added to a resin.

The geometric standard deviation $\sigma_g$ is a geometric standard deviation calculated by fitting a lognormal distribution (least squares method) to the mass-based particle size distribution obtained by the centrifugal sedimentation method in a range of a cumulative frequency of not less than 10 wt % and not more than 90 wt %.

The mass-based particle size distribution by the centrifugal sedimentation method is a mass-based particle size distribution of dispersed particles obtained by dispersing the hydrophilic dry silica powder in water at a concentration of 1.5 wt % at an output of 20 W and for a treatment time of 15 minutes.

The silica powder of the present invention is preferably such that element contents of iron, nickel, chromium, and aluminum are each less than 1 ppm. This enables reduction of short circuits between metal lines in a semiconductor device.

Further, the silica powder of the present invention is preferably such that ion contents of sodium ions, potassium ions, and chloride ions which are measured by a hot water extraction method are each less than 1 ppm. This enables reduction of malfunction of the semiconductor device and reduction of corrosion of the metal lines in the semiconductor device.

Further, it is preferable that the particles constituting the silica powder of the present invention are shaped in a sphere. Such a shape can be grasped by, for example, electron microscope observation.

The silica powder of the present invention is preferably such that a water suspension containing the silica powder at 0.075 wt % has an optical absorbance $\tau_{700}$ for light of a wavelength of 700 nm is not more than 0.60. A small value of the optical absorbance $\tau_{700}$ indicates good dispersibility, thus indicates a small dispersed particle diameter, and further indicates a narrow particle size distribution at the time of dispersion and a small number of coarse particles. This achieves better permeability.

Since the silica powder of the present invention has a median diameter $D_{50}$ and the like as described above, the specific surface area usually measured by the Brunauer-Emmett-Teller (BET) one-point method is not less than 6 m$^2$/g and not more than 14 m$^2$/g.

The use of the silica powder of the present invention as described above is not particularly limited. The silica powder of the present invention is used as, for example, a filler for a semiconductor sealant or for a semiconductor mounting adhesive, a filler for a die attach film or for a die attach paste, or a filler for a resin composition such as an insulating film for a semiconductor package substrate. In particular, the silica powder of the present invention can be suitably used as a filler for a resin composition for high-density mounting. Examples of a resin used for the resin composition include known resins as resins for semiconductor sealants and for adhesives, and specific examples thereof include epoxy resins, acrylic resins, and silicone resins.

The silica powder of the present invention can be dispersed in a solvent to form a dispersion. The dispersion may be a liquid dispersion, or may be a solid dispersion such as a solidified dispersion. The solvent used for dispersing the silica powder is not particularly limited as long as the solvent is a solvent in which the silica powder can be easily dispersed. As such a solvent, for example, water and organic solvents such as alcohols, ethers, and ketones can be used. Examples of the alcohols include methanol, ethanol, isopropanol, and the like. As the solvent, a mixed solvent of water and any one or more of the above organic solvents may be used. To improve the stability and dispersibility of silica particles, various additives may be added, including a dispersant such as a surfactant, a thickener, a wetting agent, a defoaming agent, and an acidic or alkaline pH adjusting agent. Also, the pH of the dispersion is not limited.

When such a dispersion is mixed with the resin, a resin composition containing the silica powder in a better dispersion state can be obtained than when dried silica powder is mixed with the resin. A better dispersion state of particles means fewer agglomerated particles in the resin composition. This enables the resin composition containing the silica powder of the present invention as a filler to have further improved performance in terms of both the viscometric property and the gap permeability.

Further, the silica powder of the present invention can also be used as a raw material for quartz products, abrasive grains of chemical mechanical polishing (CMP) abrasives, a toner external additive, an additive for liquid crystal sealants, a dental filler, an inkjet coating agent, and the like.

Furthermore, the silica powder of the present invention may be used as a base material or an original material containing silica powder which is treated with at least one treatment agent selected from the group consisting of a silylating agent, silicone oil, siloxanes, fatty acids, and the like, according to the above-mentioned uses.

The following will describe a method for producing the silica powder of the present invention.

The silica powder of the present invention is obtained, in a dry silica production method in which silica powder is formed by burning a silicon compound and is obtained by being grown and aggregated in a flame and in the vicinity of the flame, by installing a burner having a concentric multiple pipe structure of three or more pipes in a reactor which has a cooling jacket portion provided around the burner, and adjusting flame combustion conditions and cooling conditions. That is, silica powder of the present invention can be efficiently produced by controlling the flame combustion conditions so that the amount of oxygen in the entire flame is increased, and by controlling the cooling conditions so that a cooling rate of the flame is slowed down.

The following will describe specific examples including a method for controlling flame combustion conditions and cooling conditions.

FIG. 1 is a schematic diagram of an apparatus for producing the silica powder of the present invention. In the apparatus illustrated in FIG. 1, the circumference of a burner 1 having a concentric triple pipe structure is surrounded by a tubular external cylinder 2. If the tubular external cylinder 2 is regarded as the fourth pipe of the burner 1, the burner 1 as a whole can also be regarded as having a quadruple pipe structure. Hereinafter, the pipes constituting the concentric triple pipe will be referred to as a "central pipe", a "first annular pipe", and a "second annular pipe" in the order from the central portion to the outer edge.

The burner 1 is installed in a reactor 3 in which a flame is burned inside the reactor 3 and silica is thus formed from a silicon compound inside the reactor 3. The reactor 3 has a structure such that a jacket portion (not illustrated) is provided outside the reactor 3 to allow a refrigerant to flow therein so that the reactor 3 is subjected to forced cooling.

In the above-described apparatus, a silicon compound in a gaseous state and oxygen are mixed in advance and introduced into the central pipe of the above-described triple pipe. At this time, an inert gas such as nitrogen may also be mixed together. In a case where the silicon compound is liquid or solid at room temperature, the silicon compound is heated to be vaporized before use. Further, in a case where silica is formed by hydrolysis reaction of the silicon compound, a fuel that generate water vapor when reacted with oxygen, such as a combination of, for example, hydrogen and a hydrocarbon, is mixed together.

Further, a fuel for forming an auxiliary flame (for example, hydrogen and a hydrocarbon) is introduced into the first annular pipe which is adjacent to the central pipe of the triple pipe. At this time, an inert gas such as nitrogen may be mixed and introduced. Further, oxygen may also be mixed together.

Further, oxygen is introduced into the second annular pipe which is provided outside the first annular pipe in the triple pipe so as to be adjacent thereto. The oxygen has the following two roles: silica formation by reaction with a silicon compound; and auxiliary flame formation. At this time, an inert gas such as nitrogen may be mixed together.

Further, a mixed gas formed of oxygen and an inert gas such as nitrogen is introduced into a space defined by an outer wall of the triple pipe and an inner wall of the tubular external cylinder 2. Using air as the mixed gas is easy and is thus a preferable form.

As described above, the jacket portion is provided outside the reactor 3 to circulate a refrigerant for removing combustion heat out of the system. In most cases, the combustion gas contains water vapor. Thus, to prevent the condensation of water vapor and the subsequent corrosion of the reactor 3 caused by absorption of corrosive components in the combustion gas by condensed water, it is a preferable mode that a refrigerant temperature before combustion heat absorption (specifically, a temperature at which the refrigerant is introduced into the jacket) is not lower than 50° C. and not higher than 200° C. Considering the ease of implementation, it is a more preferable mode that hot water having a temperature of not lower than 50° C. and not higher than 90° C. is used as the refrigerant. A difference between the temperature at which the refrigerant is introduced into the jacket portion (inlet temperature) and the temperature of the refrigerant discharged from the jacket portion (outlet temperature) is calculated. Then, from the calculated temperature difference, a specific heat of the refrigerant, and the amount of the refrigerant flown, the amount of heat absorbed by the refrigerant, that is, the amount of heat removed by the refrigerant from the reactor 3 can be grasped.

To obtain the silica powder of the present invention, adjusting the flame combustion conditions and cooling conditions is particularly important as described below, and it is preferable to satisfy the following conditions.

$$R_{cmbts} \geq 0.5 \tag{A}$$

wherein $R_{cmbts}$ is the amount of oxygen introduced into the second annular pipe (mol/h)/{16×the amount of raw material gas introduced into the central pipe (mol/h)}

$$N_{G3}/M_{Si} \leq 1.0 \tag{B}$$

wherein $N_{G3}$ is the amount of gas introduced into the third annular pipe (Nm³/h), and $M_{Si}$ is a mass of silica to be formed (kg/h).

Furthermore, in a case where $R_{cmbts}$ is less than 0.5, which indicates a small amount of oxygen in an entire flame, the reaction does not proceed completely, and a growth time of particles is thus shortened. As a result, fine particles having a particle diameter of several tens of nanometers are generated, the median diameter $D_{50}$ decreases, and a value of the loose bulk density decreases.

In a case where the above-described $N_{G3}/M_{Si}$ exceeds 1.0, a flame is rapidly cooled, and as a result, fine particles having a particle diameter of several tens of nanometers are generated, and a molten silica melt has an increased region where the viscosity is high. This makes the fine particles difficult to change their shapes (This makes the fine particles difficult to grow and develops a strong tendency for the fine particles to remain small in particle diameter). Therefore, the median diameter $D_{50}$ falls below 300 nm.

As the silicon compound which is a raw material of silica powder, compounds that are gas, liquid, or solid at room temperature are used without particular limitation. For example, cyclic siloxanes such as octamethylcyclotetrasiloxane, chain siloxanes such as hexamethyldisiloxane, alkoxysilanes such as tetramethoxysilane, and chlorosilanes such as tetrachlorosilane can be used as the silicon compound.

It is preferable to use a silicon compound that does not contain chlorine in the molecular formula, such as the above-mentioned siloxanes and alkoxysilanes, because chloride ions contained in obtained silica powder can be significantly reduced.

Further, as the silicon compound, a compound having a low content of various metal impurities can be easily obtained. Thus, by using such a silicon compound having a low content of metal impurities as a raw material, the amount of metal impurities contained in the formed silica powder can be reduced. Further, by further purifying the silicon compound by distillation or the like and using the purified silicon compound as a raw material, the amount of metal impurities contained in the formed silica powder can be further reduced.

The collection of the silica powder of the present invention is not particularly limited. However, the collection of the silica powder of the present invention is performed by separating the silica powder from a combustion gas by filter separation using a sintered metal filter, a ceramic filter, a back filter, or the like filter, or by centrifugation using a cyclone or the like and collecting the silica powder.

In the above description, the concentric triple pipe used is one concentric triple pipe. However, as shown in Examples described later, the method may be carried out in a multiple-pipe system in which a plurality of concentric triple pipes are arranged. In the case of the multiple-pipe system, it is preferable that each concentric triple pipe has the same structure and the same dimensions, and distances between the nearest centers of the concentric triple pipes are identical to each other, in terms of uniformity in obtaining the silica powder of the present invention. Further, the tubular external cylinder 2 may be installed so as to cover a plurality of concentric triple pipe burners together.

As is well known, in the method for producing silica powder by burning a silicon compound, liquid-form silica melted in the flame is spheroidized by surface tension. Accordingly, particles of solid silica powder to be produced are shaped in sphere close to true sphere. Further, since the particles of the silica powder produced by the above method substantially do not contain internal bubbles, the true density is substantially the same as the theoretical density of 2.2 g/cm³ of silica. Therefore, the silica powder produced by the above-mentioned method for producing silica powder of the present invention is also shaped in sphere and has a true density of about 2.2 g/cm³.

Aspects of the present invention can also be expressed as follows:

The present invention is silica powder that satisfies all of the following conditions (1) to (3):
 (1) a cumulative 50% mass diameter $D_{50}$ of a mass-based particle size distribution obtained by a centrifugal sedimentation method is not less than 300 nm and not more than 500 nm;
 (2) a loose bulk density is not less than 250 kg/m³ and not more than 400 kg/m³; and
 (3) $\{(D_{90}-D_{50})/D_{50}\}\times 100$ is not less than 30% and not more than 45%, wherein $D_{90}$ is a cumulative 90% mass diameter of the mass-based particle size distribution obtained by the centrifugal sedimentation method.

The silica powder of the present invention is preferably such that a geometric standard deviation $\sigma_g$ of the mass-based particle size distribution obtained by the centrifugal sedimentation method is in a range of not less than 1.25 and not more than 1.40.

The silica powder of the present invention is preferably such that element contents of iron, nickel, chromium, and aluminum are each less than 1 ppm.

The silica powder of the present invention is preferably such that ion contents of sodium ions, potassium ions, and chloride ions which are measured by a hot water extraction method are each less than 1 ppm.

Further, the present invention provides: a resin composition in which the silica powder of the present invention is filled with a resin; and a dispersion in which the silica powder of the present invention is dispersed in a solvent.

EXAMPLES

Examples and Comparative Examples will be described to specifically explain the present invention. Note, however, that the present invention is not limited by these Examples.

Note that various physical property measurements in Examples and Comparative Examples below are performed by the following methods.
(1) BET Specific Surface Area The BET specific surface area S (m²/g) was measured by the nitrogen adsorption BET one-point method using a specific surface area measuring device SA-1000 manufactured by Shibata Rikagaku Co., Ltd.
(2) Absorbance $\tau_{700}$ 0.3 g of silica powder and 20 ml of distilled water were put into a glass sample tube bottle (manufactured by AS ONE Corporation, content of 30 ml, outer diameter of about 28 mm). The sample tube bottle containing a sample was placed in a manner that a probe tip of an ultrasonic cell crusher (manufactured by BRANSON Ltd., Sonifier II, Model 250D, probe: 1.4 inches) was 15 mm below the water surface level, and the silica powder was dispersed in the distilled water under the conditions of an output of 20 W and a dispersion time of 15 minutes, so that an aqueous suspension having a silica concentration of 1.5 wt % was prepared. Subsequently, this aqueous suspension was further diluted with distilled water to reduce the concentration to one-twentieth, so that an aqueous suspension containing silica at a concentration of 0.075 wt % was obtained.

The absorbance $\tau_{700}$ of the obtained aqueous suspension having a silica concentration of 0.075 wt % with respect to light having a wavelength of 700 nm was measured using a spectrophotometer V-630 manufactured by JASCO Corporation. At the time of measurement, the absorbance $\tau_{460}$ of the aqueous suspension having a silica concentration of 0.075 wt % with respect to light having a wavelength of 460 nm was also measured, and a dispersibility index n defined by ln $(\tau_{700}/\tau_{460})/\ln(460/700)$ was also obtained.

(3) Mass-Based Particle Size Distribution by Centrifugal Sedimentation Method

A mass-based particle size distribution of the aqueous suspension having a silica concentration of 1.5 wt % obtained by the above-described method was measured using a disk centrifugal particle size distribution measuring device DC24000 manufactured by CPS Instruments Inc. The measurement conditions were a rotation speed of 9000 rpm and a silica true density of 2.2 g/cm³.

A cumulative 50% mass diameter $D_{50}$ and a cumulative 90% mass diameter $D_{90}$ were calculated from the obtained mass-based particle size distribution. Further, a geometric standard deviation $\sigma_g$ was calculated by fitting a lognormal distribution to the obtained mass-based particle size distribution in a range of a cumulative frequency of not less than 10% by mass and not more than 90% by mass.

(4) Bulk Density

The loose bulk density and the packed bulk density were measured using a powder characteristics evaluation device powder tester PT-X type manufactured by Hosokawa Micron Corporation. The "loose bulk density" in the present invention refers to a bulk density in a loosely filled state, which is measured in the following manner. That is, a sample is uniformly supplied, to a cylindrical container (material: stainless steel) having a volume of 100 mL, from 18 cm above the cylindrical container, the upper surface is scraped, and weighing is carried out.

On the other hand, a "packed bulk density" refers to a bulk density in a densely filled state which is brought about by tapping the loosely filled container. Here, the tapping refers to an operation in which a container filled with a sample is repeatedly dropped from a constant height to give a light impact on the bottom so that the container is densely filled with the sample. Specifically, after scraping the upper surface and performing weighing to measure the loose bulk density, a cap (equipment of the powder tester manufactured by Hosokawa Micron Corporation below) is further put on this container, and powder is added up to the upper edge of the cap. Then, tapping is performed 180 times. After the tapping is finished, the cap is removed, the powder is scraped on the upper surface of the container, and weighing is performed. The bulk density in this state is regarded as the packed bulk density.

(5) Element Contents of Iron, Nickel, Chromium, and Aluminum 2 g of dried silica powder was precisely weighed and was transferred to a platinum dish, and 10 mL of concentrated nitric acid and 10 mL of hydrofluoric acid were added in this order. The platinum dish was placed on a hot plate set at 200° C. and was heated to dry the contents. After cooling to room temperature, 2 mL of concentrated nitric acid was further added, and the platinum dish was placed on a hot plate set at 200° C. and was heated for dissolution. After cooling to room temperature, the solution, which is the contents in the platinum dish, was transferred to a volumetric flask having a capacity of 50 mL, and was diluted with ultrapure water so as to be aligned with a marked line. In the resultant solution as a sample, element contents of iron, nickel, chromium, and aluminum were measured by an ICP emission spectrometer (manufactured by Shimadzu Corporation, model number ICPS-1000IV).

(6) Ion Content by Hot Water Extraction Method 5 g of silica powder was added to 50 g of ultrapure water, and a resultant solution was heated at 120° C. for 24 hours using a decomposition container made of fluororesin to carry out hot water extraction of ions. The ultrapure water and silica powder were weighed to 0.1 mg units. Subsequently, the solid content was separated using a centrifuge to obtain a measurement sample. The same operation was performed only with ultrapure water, and this ultrapure water was used as a blank sample for measurement.

The concentrations of sodium ions, potassium ions, and chloride ions contained in the measurement sample and in the blank sample were quantified using the ion chromatography system ICS-2100 manufactured by Nippon Dionex Co., Ltd., and were calculated using the following formula:

$$C_{Silica} = (C_{Sample} - C_{Blank}) \times M_{PW} / M_{Silica}$$

wherein:
$C_{Silica}$ is an ion concentration in silica (ppm),
$C_{Sample}$ is an ion concentration in the measurement sample (ppm),
$C_{Blank}$ is an ion concentration in the blank sample (ppm),
$M_{PW}$ is the amount of ultrapure water (g), and
$M_{Silica}$ is a silica weight (g).

The $C_{Blank}$ of each kind of ions was all 0 ppm.

(7) Electron Microscope Observation 0.03 g of silica powder was weighed, was added to 30 ml of ethanol, and was then dispersed for 5 minutes using an ultrasonic cleaner to obtain an ethanol suspension. After this suspension was dropped onto a silicon wafer, the silicon wafer was dried, and the particle shape was determined by SEM observation of silica using a field emission scanning electron microscope S-5500 manufactured by Hitachi High-Technologies Corporation.

(8) Production Conditions

The basic structure was carried out by the apparatus as illustrated in FIG. 1. However, depending on the experimental example, the number of burners may be three. Hot water was circulated as the refrigerant. In addition to the aforementioned definitions, definitions under the production conditions shown in the tables are as below.

Oxygen Concentration (Number of moles of oxygen introduced into the central pipe)/(Number of moles of oxygen introduced into the central pipe+Number of moles of nitrogen introduced into the central pipe)×100

RO (Number of moles of oxygen introduced into the central pipe)/(16×Number of moles of raw material introduced into the central pipe)

$R_{SFL}$ (Number of moles of hydrogen introduced into the first annular pipe)/(32×Number of moles of raw material introduced into the central pipe)

Heat Removal Quantity (Specific heat of hot water)×(Amount of hot water introduced)×(Hot water outlet temperature−Hot water inlet temperature)

Since hot water was introduced at 75° C. in all experimental examples, the hot water inlet temperature is 75° C. Further, 1 kcal/kg was used as the specific heat of hot water. The outlet and the inlet are a hot water discharge port and a hot water introduction port in the jacket portion (not illustrated).

Combustion Heat Quantity (Number of moles of introduced raw material×Combustion heat quantity of raw material)+(Number of moles of introduced hydrogen×Combustion heat quantity of hydrogen)

1798 kcal/mol was used as the combustion heat quantity of a raw material (octamethylcyclotetrasiloxane), and 58 kcal/mol was used as the combustion heat quantity of hydrogen.

Table 1 will be discussed in which the central pipe, the first annular pipe, and the second annular pipe of the concentric triple pipe are described simply as the central canal, the first annular pipe, and the second annular pipe, respectively. A is a distance between the center of the central pipe and the center of another central pipe (a length of the side of the equilateral triangle), d is an inner diameter of the central pipe, and D is a shortest distance between the center of the central pipe and the inner wall of the reactor. When D/d is larger, it means a greater distance between a flame and the inner wall of the reactor.

Example 1

Three concentric triple pipes of the same dimension were used as burners. These concentric triple pipes were arranged such that the centers of concentric triple pipes formed an equilateral triangle, and a tubular external cylinder was attached so as to surround the concentric triple pipes. The three burners were mounted such that the centers of the burners were located at the center of the reactor, and the experiment was carried out.

Under the above settings, octamethylcyclotetrasiloxane was burned as described below to produce silica powder. Hereinafter, the octamethylcyclotetrasiloxane will be referred to simply as a raw material.

After a vaporized raw material, oxygen, and nitrogen were mixed, a resultant mixture was introduced into the central pipe of the concentric triple pipe at 200° C. Further, hydrogen and nitrogen were mixed, and a resultant mixture was introduced into the first annular pipe, which is the nearest outer peripheral pipe to the central pipe of the concentric triple pipe. Further, oxygen was introduced into the second annular pipe, which is the nearest outer peripheral pipe to the first annular pipe of the concentric triple pipe. In addition, air was introduced into a space defined by the outer wall of the second annular pipe of the concentric triple pipe and the inner wall of the external pipe surrounding the concentric triple pipe.

Hot water was introduced into the jacket portion of the reactor at 75° C.

BET specific surface area S, absorbance $\tau_{460}$, absorbance $\tau_{700}$, mass-based particle size distribution by centrifugal sedimentation method, loose bulk density, packed bulk density, Fe content, Ni content, Cr content, Al content, Na$^+$ content, K$^+$ content, and Cl$^-$ content of the obtained silica powder were measured. Further, the shape of the primary particles constituting the silica powder was determined by electron microscope observation. From the measured BET specific surface area S, the BET specific surface area conversion diameter $D_B$ was calculated. From the absorbance $\tau_{460}$ and the absorbance $\tau_{700}$, the dispersibility index n was calculated. From the mass-based particle size distribution by the centrifugal sedimentation method, the median diameter $D_{50}$ and cumulative 90 mass % diameter $D_{90}$, and the geometric standard deviation $\sigma_g$ were calculated.

Table 1 shows the production conditions and the properties of the obtained silica powder. The contents of Fe, Ni, Cr, Al, Na$^+$, K$^+$ and Cl$^-$ were all less than 1 ppm.

Examples 2 to 11

The production conditions were changed as shown in Table 2, and silica powder was produced in the same manner as in Example 1. Table 1 shows the physical properties of the obtained silica powder. In all of Examples, the contents of Fe, Ni, Cr, Al, Na$^+$, K$^+$ and Cl$^-$ were all less than 1 ppm.

Comparative Examples 1 to 6

The production conditions were changed as shown in Table 2, and silica powder was produced in the same manner as in Example 1. However, in Comparative Examples 3 to 6, the concentric triple pipe burners were changed to only one concentric triple pipe burner, and the inner diameter of the central pipe of the concentric triple pipe used was enlarged twice the inner diameter of the central pipe of the concentric triple pipe in Example 1. The sizes of the first annular pipe and the second annular pipe were also enlarged accordingly. In addition, the central pipe was placed such that the center of the central pipe of the concentric triple pipe was located on the central axis of the reactor.

Table 2 shows the physical properties of the obtained silica powder.

TABLE 1

| | | | Example 1 | Example 2 | Example 3 | Example 4 | Example 5 | Example 6 |
|---|---|---|---|---|---|---|---|---|
| Production conditions | Number of concentric triple pipes | [Number] | 3 | 3 | 3 | 3 | 3 | 3 |
| | A/d | [—] | 2.9 | 2.9 | 2.9 | 2.9 | 2.9 | 2.9 |
| | D/d | [—] | 11.4 | 11.4 | 8.1 | 8.1 | 8.1 | 8.1 |
| | Oxygen concentration | [%] | 53 | 53 | 53 | 53 | 53 | 53 |
| | RO | [—] | 0.25 | 0.25 | 0.25 | 0.25 | 0.25 | 0.25 |
| | $R_{SFL}$ | [—] | 0.15 | 0.15 | 0.15 | 0.15 | 0.15 | 0.14 |
| | $R_{cmbts}$ | [—] | 0.82 | 0.82 | 0.82 | 0.82 | 0.82 | 0.83 |
| | $N_{G3}/M_{Si}$ | [Nm$^3$/kg] | 0.82 | 0.27 | 0.82 | 0.27 | 0.00 | 0.25 |
| | Heat removal quantity/ combustion heat quantity | [%] | 52 | 56 | 36 | 46 | 51 | 43 |
| Physical properties | BET specific surface area | [m$^2$/g] | 10.5 | 10.7 | 11.8 | 10.4 | 9.9 | 10.1 |
| | $\tau_{460}$ | [—] | 1.00 | 0.95 | 0.92 | 1.04 | 1.05 | 1.03 |
| | $\tau_{700}$ | [—] | 0.37 | 0.36 | 0.34 | 0.39 | 0.40 | 0.39 |
| | n | [—] | 2.34 | 2.33 | 2.36 | 2.32 | 2.31 | 2.32 |
| | $D_{50}$ | [nm] | 360 | 357 | 336 | 367 | 377 | 367 |
| | $D_{90}$ | [nm] | 490 | 492 | 475 | 497 | 507 | 491 |
| | $\{(D_{90} - D_{50})/D_{50}\} \times 100$ | [%] | 36 | 38 | 41 | 35 | 35 | 34 |
| | $\sigma_g$ | [—] | 1.32 | 1.37 | 1.38 | 1.31 | 1.31 | 1.30 |
| | Shape of primary particles | [—] | Spherical | Spherical | Spherical | Spherical | Spherical | Spherical |

TABLE 1-continued

|  |  |  |  |  |  |  |  |
|---|---|---|---|---|---|---|---|
| Loose bulk density | [kg/m³] | 316 | 285 | 277 | 303 | 285 | 283 |
| Packed bulk density | [kg/m³] | 480 | 448 | 418 | 487 | 477 | 474 |

|  |  |  | Example 7 | Example 8 | Example 9 | Example 10 | Example 11 |
|---|---|---|---|---|---|---|---|
| Production conditions | Number of concentric triple pipes | [Number] | 3 | 3 | 3 | 3 | 3 |
|  | Δ/d | [—] | 2.9 | 2.9 | 2.9 | 2.9 | 2.9 |
|  | D/d | [—] | 8.1 | 8.1 | 8.1 | 8.1 | 8.1 |
|  | Oxygen concentration | [%] | 53 | 53 | 53 | 53 | 53 |
|  | RO | [—] | 0.25 | 0.25 | 0.25 | 0.25 | 0.25 |
|  | $R_{SFL}$ | [—] | 0.12 | 0.22 | 0.26 | 0.26 | 0.37 |
|  | $R_{cmbts}$ | [—] | 0.83 | 0.82 | 0.82 | 0.92 | 0.82 |
|  | $N_{G3}/M_{Si}$ | [Nm³/kg] | 0.22 | 0.27 | 0.27 | 0.27 | 0.27 |
|  | Heat removal quantity/ combustion heat quantity | [%] | 39 | 50 | 49 | 48 | 46 |
| Physical properties | BET specific surface area | [m²/g] | 10.1 | 9.4 | 9.3 | 9.5 | 9.4 |
|  | $\tau_{460}$ | [—] | 1.00 | 1.10 | 1.10 | 1.09 | 1.06 |
|  | $\tau_{700}$ | [—] | 0.38 | 0.43 | 0.43 | 0.42 | 0.41 |
|  | N | [—] | 2.33 | 2.25 | 2.26 | 2.27 | 2.27 |
|  | $D_{50}$ | [nm] | 364 | 395 | 397 | 388 | 393 |
|  | $D_{90}$ | [nm] | 489 | 541 | 541 | 529 | 534 |
|  | $\{(D_{90} - D_{50})/D_{50}\} \times 100$ | [%] | 34 | 37 | 36 | 36 | 36 |
|  | $\sigma_g$ | [—] | 1.30 | 1.32 | 1.31 | 1.31 | 1.31 |
|  | Shape of primary particles | [—] | Spherical | Spherical | Spherical | Spherical | Spherical |
|  | Loose bulk density | [kg/m³] | 293 | 284 | 313 | 300 | 291 |
|  | Packed bulk density | [kg/m³] | 469 | 462 | 528 | 508 | 508 |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Production conditions | Number of concentric triple pipes | [Number] | 3 | 3 | 1 | 1 | 1 | 1 |
|  | Δ/d | [—] | 4.7 | 2.9 | — | — | — | — |
|  | D/d | [—] | 10.3 | 8.1 | 13.0 | 6.5 | 6.5 | 6.5 |
|  | Oxygen concentration | [%] | 45 | 30 | 20 | 34 | 34 | 75 |
|  | RO | [—] | 0.25 | 0.42 | 0.31 | 0.78 | 0.78 | 0.60 |
|  | $R_{SFL}$ | [—] | 0.19 | 0.23 | 0.19 | 0.13 | 0.13 | 0.08 |
|  | $R_{cmbts}$ | [—] | 0.83 | 0.68 | 0.83 | 0.27 | 0.27 | 0.18 |
|  | $N_{G3}/M_{Si}$ | [Nm³/kg] | 1.03 | 1.27 | 3.09 | 1.34 | 0.33 | 0.67 |
|  | Heat removal quantity/ combustion heat quantity | [%] | 45 | 26 | 32 | 35 | 46 | 34 |
| Physical properties | BET specific surface area | [m²/g] | 14.9 | 16.5 | 31.6 | 21.7 | 15.3 | 12.4 |
|  | $\tau_{460}$ | [—] | 0.79 | 0.58 | 2.96 | 3.03 | 0.62 | 0.72 |
|  | $\tau_{700}$ | [—] | 0.28 | 0.20 | 1.24 | 2.18 | 0.21 | 0.25 |
|  | n | [—] | 2.45 | 2.58 | 2.07 | 0.79 | 2.54 | 2.49 |
|  | $D_{50}$ | [nm] | 296 | 238 | 140 | 200 | 256 | 283 |
|  | $D_{90}$ | [nm] | 402 | 318 | 196 | 263 | 344 | — |
|  | $\{(D_{90} - D_{50})/D_{50}\} \times 100$ | [%] | 36 | 34 | 40 | 31 | 34 | — |
|  | $\sigma_g$ | [—] | 1.38 | 1.30 | 1.35 | 1.30 | 1.31 | 1.27 |
|  | Shape of primary particles | [—] | Spherical | Spherical | Spherical | Spherical | Spherical | Spherical |
|  | Loose bulk density | [kg/m³] | 197 | 207 | 123 | 144 | 203 | — |
|  | Packed bulk density | [kg/m³] | — | 313 | 195 | 241 | 332 | — |

REFERENCE SIGNS LIST 1 burner
2 tubular external cylinder
3 reactor

The invention claimed is:

1. Silica powder that satisfies all of the following conditions (1) to (4):
   (1) a cumulative 50% mass diameter D50 of a mass-based particle size distribution obtained by a centrifugal sedimentation method is not less than 300 nm and not more than 500 nm;
   (2) a loose bulk density is not less than 250 kg/m3 and not more than 400 kg/m3;
   (3) {(D90−D50)/D50}×100 is not less than 30% and not more than 45%, wherein D90 is a cumulative 90% mass diameter of the mass-based particle size distribution obtained by the centrifugal sedimentation method; and
   (4) a water suspension containing the silica powder at 0.075 wt % has an optical absorbance 1700 for light of a wavelength of 700 nm is not more than 0.60.

2. The silica powder according to claim 1, wherein a geometric standard deviation σg of the mass-based particle size distribution obtained by the centrifugal sedimentation method is in a range of not less than 1.25 and not more than 1.40.

3. The silica powder according to claim 1, wherein element contents of iron, nickel, chromium, and aluminum are each less than 1 ppm.

4. The silica powder according to claim 1, wherein ion contents of sodium ions, potassium ions, and chloride ions which are measured by a hot water extraction method are each less than 1 ppm.

5. The silica powder according to claim 1, wherein a dispersibility index n defined by ln $(\tau_{700}/\tau_{460})$/ln (460/700) with use of the optical absorbance $\tau_{700}$ and an optical absorbance $\tau_{460}$ of an aqueous suspension with respect to light having a wavelength of 460 nm is not less than 2.25 and not more than 2.36.

6. A resin composition in which silica powder according to claim 1 is filled with a resin.

7. A dispersion in which silica powder according to claim 1 is dispersed in a solvent.

* * * * *

UNITED STATES PATENT AND TRADEMARK OFFICE
CERTIFICATE OF CORRECTION

PATENT NO. : 12,098,076 B2
APPLICATION NO. : 17/425852
DATED : September 24, 2024
INVENTOR(S) : Keiji Saiki et al.

Page 1 of 1

It is certified that error appears in the above-identified patent and that said Letters Patent is hereby corrected as shown below:

In the Claims

Column 15, Claim 1, Line 20 reads:
0.075 wt % has an optical absorbance 1700 for light of Whereas it should read:
0.075 wt % has an optical absorbance $\tau_{700}$ for light of Signed and Sealed this
Twenty-sixth Day of November, 2024

Katherine Kelly Vidal
*Director of the United States Patent and Trademark Office*